(12) United States Patent
Nicoleau et al.

(10) Patent No.: US 9,567,262 B2
(45) Date of Patent: Feb. 14, 2017

(54) HARDENING ACCELERATOR COMPOSITION CONTAINING DISPERSANTS

(75) Inventors: Luc Nicoleau, Altenmarkt an der Alz (DE); Gerhard Albrecht, Prien am Chiemsee (DE)

(73) Assignee: Construction Research & Technology GmbH, Trostberg (DE)

( * ) Notice: Subject to any disclaimer, the term of this patent is extended or adjusted under 35 U.S.C. 154(b) by 498 days.

(21) Appl. No.: 13/035,281

(22) Filed: Feb. 25, 2011

(65) Prior Publication Data

US 2011/0203486 A1    Aug. 25, 2011

Related U.S. Application Data

(60) Provisional application No. 61/307,890, filed on Feb. 25, 2010.

(30) Foreign Application Priority Data

Feb. 25, 2010    (EP) .................................... 10154728

(51) Int. Cl.
  *C04B 40/00*    (2006.01)
  *C04B 103/14*   (2006.01)
  *C04B 28/02*    (2006.01)

(52) U.S. Cl.
  CPC ............ *C04B 28/02* (2013.01); *C04B 40/0042* (2013.01); *C04B 2103/14* (2013.01); *Y02W 30/94* (2015.05)

(58) Field of Classification Search
  CPC ........ C04B 22/00; C04B 22/062; C04B 24/00; C04B 40/0625
  USPC .... 524/2, 425; 106/817, 638, 738, 802, 805, 106/705, 772, 789, 808, 823, 287.14, 401, 106/634, 640, 660, 672, 677, 680, 694, 106/710, 714, 718, 725, 727, 728, 106/732, 737, 739, 791, 792, 795, 106/803, 806, 809, 810, 814, 815, 816
  See application file for complete search history.

(56) References Cited

U.S. PATENT DOCUMENTS

| | | | |
|---|---|---|---|
| 5,332,041 A | 7/1994 | Onan et al. |
| 5,355,954 A | 10/1994 | Onan et al. |
| 5,360,841 A | 11/1994 | Knop et al. |
| 5,413,634 A | 5/1995 | Shawl et al. |
| 5,609,680 A | 3/1997 | Kobayashi et al. |

(Continued)

FOREIGN PATENT DOCUMENTS

| | | |
|---|---|---|
| CA | 2071051 A1 | 12/1992 |
| DE | 35 27 981 A1 | 2/1987 |

(Continued)

OTHER PUBLICATIONS

Cölfen, Helmut; "Analytical Ultracentrifugation of Nanoparticles"; Polymer News; 2004; vol. 29; p. 101-116; Taylor & Francis; Abstract.

(Continued)

*Primary Examiner* — Kaj K Olsen
*Assistant Examiner* — Karam Hijji
(74) *Attorney, Agent, or Firm* — Curatolo Sidoti Co., LPA; Joseph G. Curatolo; Salvatore A. Sidoti (57) ABSTRACT

A process for the preparation of a hardening accelerator composition by reaction of a water-soluble calcium compound with a water-soluble silicate compound, said reaction being effected in the presence of a water-soluble dispersant having at least one polyalkyleneglycol structural unit with a functional group at one end of the polyalkyleneglycol, being able to interact as an anchor group with the surface of cement particles, the hardening accelerator composition and its use.

9 Claims, 1 Drawing Sheet

(56) References Cited

U.S. PATENT DOCUMENTS

| | | |
|---|---|---|
| 5,709,743 A | 1/1998 | Leture et al. |
| 5,750,634 A | 5/1998 | Albrecht et al. |
| 5,879,445 A * | 3/1999 | Guicquero et al. ............ 106/696 |
| 5,925,184 A | 7/1999 | Hirata et al. |
| 6,133,347 A | 10/2000 | Vickers, Jr. et al. |
| 6,170,574 B1 | 1/2001 | Jones |
| 6,451,881 B1 | 9/2002 | Vickers, Jr. et al. |
| 6,492,461 B1 | 12/2002 | Vickers, Jr. et al. |
| 6,832,652 B1 | 12/2004 | Dillenbeck et al. |
| 6,855,752 B2 | 2/2005 | Velten et al. |
| 6,861,459 B2 | 3/2005 | Porsch et al. |
| 6,908,955 B2 | 6/2005 | Porsch et al. |
| 7,041,167 B2 | 5/2006 | Jiang |
| 7,258,736 B2 | 8/2007 | Oriakhi et al. |
| 7,605,196 B2 | 10/2009 | Schinabeck et al. |
| 7,641,731 B2 | 1/2010 | Chanut et al. |
| 7,772,300 B2 | 8/2010 | Schinabeck et al. |
| 8,349,960 B2 | 1/2013 | Gaeberlein et al. |
| 8,436,072 B2 | 5/2013 | Herth et al. |
| 2002/0129743 A1 | 9/2002 | Frailey et al. |
| 2003/0181579 A1 | 9/2003 | Porsch et al. |
| 2004/0261664 A1 | 12/2004 | Oriakhi et al. |
| 2007/0032550 A1 | 2/2007 | Lewis et al. |
| 2007/0163470 A1 | 7/2007 | Chanut et al. |
| 2008/0108732 A1 | 5/2008 | Wieland et al. |
| 2008/0190614 A1* | 8/2008 | Ballard ........................ 166/293 |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2009/0229492 A1 | 9/2009 | Mills |
| 2010/0190888 A1 | 7/2010 | Gaeberlein et al. |
| 2011/0015301 A1 | 1/2011 | Herth et al. |
| 2011/0095227 A1 | 4/2011 | Herth et al. |
| 2011/0160393 A1 | 6/2011 | Sakamoto et al. |
| 2012/0196046 A1 | 8/2012 | Nicoleau et al. |
| 2012/0216724 A1 | 8/2012 | Nicoleau et al. |
| 2012/0220696 A1 | 8/2012 | Nicoleau et al. |
| 2012/0270969 A1 | 10/2012 | Bichler et al. |
| 2012/0270970 A1 | 10/2012 | Bichler et al. |
| 2013/0118381 A1 | 5/2013 | Frenkenberger et al. |
| 2014/0066546 A1 | 3/2014 | Langlotz et al. |

FOREIGN PATENT DOCUMENTS

| | | |
|---|---|---|
| DE | 43 42 407 A1 | 6/1995 |
| DE | 44 11 797 A1 | 10/1995 |
| DE | 197 24 700 A1 | 12/1998 |
| DE | 103 51 259 A1 | 6/2005 |
| DE | 10 2005 001 101 A1 | 7/2006 |
| DE | 20 2006 016 797 U1 | 12/2006 |
| DE | 10 2006 041 552 A1 | 3/2008 |
| EP | 0 518 156 A2 | 12/1992 |
| EP | 1 655 272 A1 | 5/2006 |
| JP | 2000-095554 A | 4/2000 |
| JP | 2001-058863 A | 3/2001 |
| JP | 2003-292357 A | 10/2003 |
| JP | 2008-127247 | 6/2008 |
| WO | WO 94/08913 A1 | 4/1994 |
| WO | WO 00/44487 A1 | 8/2000 |
| WO | WO 01/04185 A1 | 1/2001 |
| WO | WO 02/070425 A1 | 9/2002 |
| WO | WO 2006/138277 A2 | 12/2006 |
| WO | WO 2007125311 A1 * | 11/2007 |
| WO | WO 2008/145975 A1 | 12/2008 |
| WO | WO 2008145975 A1 * | 12/2008 |
| WO | WO 2010/026155 A1 | 3/2010 |
| WO | WO 2010/040611 A1 | 4/2010 |

OTHER PUBLICATIONS

Saito, Fumio, et al.; "Mechanochemical Synthesis of Hydrated Calcium Silicates by Room Temperature Grinding"; Solid State Ionics; 1997; pp. 37-43; Elsevier.

"Silica"; Ullmann's Encyclopedia of Industrial Chemistry; 2002; Wiley-VCH Verlag GmbH & Co. KGaA; Abstract.

* cited by examiner

HARDENING ACCELERATOR COMPOSITION CONTAINING DISPERSANTS

The present application claims the benefit of the filing date, under 35 U.S.C. §119(e), from U.S. Provisional Application Ser. No. 61/307,890, filed Feb. 25, 2010, and under 35 U.S.C. §119 (a-d) or (f), from EP 10 154 728.9, which applications are incorporated herein by reference.

The present disclosure relates to a process for the preparation of a hardening accelerator composition, the hardening accelerator composition and the use of the hardening accelerator composition.

It is known that admixtures in the form of dispersants are often added to aqueous slurries of pulverulent inorganic or organic substances, such as clays, silicate powders, chalks, carbon blacks, powdered rocks and hydraulic binders, for improving their workability, i.e. kneadability, spreadability, sprayability, pumpability or flowability. Such admixtures are capable of breaking up solid agglomerates, dispersing the particles formed and in this way improving the fluidity. This effect is also utilised in a targeted manner in particular in the preparation of building material mixtures which contain hydraulic binders, such as cement, lime, gypsum, calcium sulphate hemihydrate (bassanite), anhydrous calcium sulphate (anhydrite), or latent hydraulic binders, such as fly ash, blast furnace slag or pozzolans.

In order to convert these building material mixtures based on said binders into a ready-to-use, workable form, as a rule substantially more mixing water is required than would be necessary for the subsequent hydration and hardening process. The proportion of cavities which are formed in the concrete body by the excess water which subsequently evaporates leads to significantly poorer mechanical strengths and durabilities.

In order to reduce this excess proportion of water at a predetermined processing consistency and/or to improve the workability at a predetermined water/binder ratio, admixtures which are generally referred to as water-reducer compositions or plasticizers are used. In particular, copolymers which are prepared by free radical copolymerization of acid monomers with polyether macromonomers are used in practice as such compositions. Also dispersants are known which basically show a structure in which a so called anchoring group or several anchor groups, which is able to interact with the surface of cement particles is attached to a polyalkyleneglycol polymer chain. Respective dispersants are for example described in the patent applications US 2003 0181 579 A1, WO 0104 185 A1, U.S. Pat. No. 6,451,881 B1 and U.S. Pat. No. 6,492,461 B1. Various dispersant chemistries with anchor groups basing on anionic radicals, alkoxy silane radical(s) and polyhydroxy radicals (especially sugar residues) are described. The dispersants are used in cementitious formulations, like concrete, grouts and mortars.

Furthermore, admixtures for building material mixtures comprising hydraulic binders typically also contain hardening accelerators which shorten the setting time of the hydraulic binder. According to WO 02/070425, calcium silicate hydrate in particular present in dispersed (finely or particularly finely dispersed) form, can be used as such a hardening accelerator. However, commercially available calcium silicate hydrate or corresponding calcium silicate hydrate dispersions may be regarded only as hardening accelerators which have little effect.

Provided, therefore, is a composition which acts in particular as a hardening accelerator.

This is achieved by a process for the preparation of a hardening accelerator composition by reaction of a water-soluble calcium compound with a water-soluble silicate compound, the reaction of the water-soluble calcium compound with the water-soluble silicate compound being effected in the presence of an aqueous solution which contains a water-soluble dispersant comprising at least one polyalkyleneglycol structural unit with a functional group at one end of the polyalkyleneglycol, said functional group being able to interact as an anchor group with the surface of cement particles. Preferably the process for the preparation of the hardening accelerator composition is done in the absence of cement and preferably the obtained products do not contain cement or any of its hydration products. Preferably the hardening accelerator composition is a stable liquid, aqueous dispersion, which does not segregate or harden in the absence of hydraulic binders like for example cement. This is also achieved by a process for the preparation of a hardening accelerator by reaction of a calcium compound, preferably a calcium salt, most preferably a water-soluble calcium salt with a silicon dioxide containing component under alkaline conditions, characterized in that the reaction is carried out in the presence of an aqueous solution of a water-soluble dispersant comprising at least one polyalkyleneglycol structural unit with a functional group at one end of the polyalkyleneglycol, said functional group being able to interact as an anchor group with the surface of cement particles. Preferably the process for the preparation of the hardening accelerator composition is done in the absence of cement and preferably the obtained products do not contain cement or any of its hydration products. Preferably the hardening accelerator composition is a stable liquid, aqueous dispersion, which does not segregate or harden in the absence of hydraulic binders like for example cement. Preferably said dispersant is suitable as a plasticizer for hydraulic binders.

This is also achieved by a composition, preferably an aqueous hardening accelerator suspension, containing calcium silicate hydrate and a water-soluble dispersant comprising at least one polyalkyleneglycol structural unit with a functional group at one end of the polyalkyleneglycol, said functional group being able to interact as an anchor group with the surface of cement particles. This is also achieved by the use of said composition as hardening accelerator in building material mixtures containing cement, gypsum, anhydrite, slag, preferably ground granulated blast furnace slag, fly ash, silica dust, metakaolin, natural pozzolans, calcined oil shale, calcium sulpho aluminate cement and/or calcium aluminate cement, preferably in building material mixtures which contain substantially cement as a hydraulic binder.

In principle, only relatively slightly water-soluble compounds are also suitable in each case as water-soluble calcium compounds and water-soluble silicate compounds, although readily water-soluble compounds (which dissolve completely or virtually completely in water) are preferred in each case. However, it must be ensured there is a sufficient reactivity for the reaction in the aqueous environment with the corresponding reactant (either water-soluble calcium compound or water-soluble silicate compound). It is to be assumed that the reaction takes place in aqueous solution but a water-insoluble inorganic compound (calcium silicate hydrate) is usually present as a reaction product.

The water-soluble dispersant comprises at least one polyalkyleneglycol structural unit, preferably one polyalkyleneglycol structural unit, with a functional group at one end of the polyalkyleneglycol, said functional group being able to interact as an anchor group with the surface of cement particles. The dispersant is preferably suitable as a plasticizer for hydraulic binders, more preferably the requirements of the industrial standard EN 934-2 (February 2002) are fulfilled by the plasticizers. It is believed that the subject dispersants are also able to interact with the surface of calcium silicate hydrate particles.

The subject dispersant is different from the so called polycarboxylate ether (PCE) type of dispersants. PCEs are polymers, characterized by a plurality of repeating units carrying a carboxylic acid group in the polymer backbone and a plurality of repeating units carrying side-chains, the side-chains typically comprising polyalkyleneglycol units.

The subject dispersants are not a polymeric structure, with the exception of the polyalkyleneglycol part, which can be seen as a polymer. Preferably the subject dispersant does not contain polymeric structures other than the polyalkyleneglycol structural unit. In particular the subject dispersant is not obtained by a free radical polymerization of ethylenically unsaturated monomers, for example (meth)acrylic acid and esters of (meth)acrylic acid with monohydroxyfunctional polyalkyleneglycols. The dispersant is also not obtained by an esterification of a polyacrylic backbone polymer with monohydroxyfunctional polyalkyleneglycols.

Preferably the polyalkyleneglycol part of the dispersant is a straight chain polyalkyleneglycol. Preferably the polyalkyleneglycol is a C2 to C18 polyalkyleneglycol, more preferably a C2 and/or C3, most preferably a C2 polyalkyleneglycol. Advantage of the C2 polyalkyleneglycol (polyethyleneglycol) is its good solubility in water.

The chain length of the polyalkyleneglycol structure is defined by the number of alkyleneoxide repeating units. The polyalkyleneglycol comprises at least 5 alkylene oxide repeating units, preferably from 10 to 500 alkylene oxide repeating units, more preferably from 10 to 200 alkylene oxide repeating units, and contains more than 80 mol-% of ethyleneglycol units, preferably more than 90 mol-% of ethyleneglycol units.

The functional group being able to interact as an anchor group with the surface of cement particles comprises preferably anionic radicals, silane radicals and/or polyhydroxy radicals.

The term "anionic radicals" includes also radicals, which can form under alkaline pH-conditions (as generally present in cementitious systems) anionic radicals (for example from the respective acid form). One or several anionic radicals can be preferably selected from the group of phosphates, phosphonates, phosphinates, hypophosphites, sulphates, sulphonates, sulphinates, borates, boronates and/or carboxylates, including the acid form of said anionic radicals. Preferably the anionic radical comprises phosphonates and/or carboxylates.

Dispersants based on the phosphonate chemistry are described in WO 94/08913 A1. All dispersants based on the phosphonate anchor group chemistry according to said patent application can be used as the dispersant in the process, product and use according to this specification. The disclosure of the phosphonate dispersants in WO 94/08913 A1 is hereby incorporated by reference. Examples for dispersants with one to three anchor groups (phosphonate radicals) are the following structures:

(1 phosphonate)

(2 phosphonates)

(3 phosphonates)

Especially preferable are phosphonate based dispersants, characterized in that the functional group being able to interact as an anchor group with the surface of cement particles contains two phosphonate radicals and is characterized by the following general structure (I), $$R-O-(AO)_n-CH_2CH_2-N-[CH_2-PO(OM)_2]_2 \quad (I)$$

wherein
A is the same or different and independently from each other an alkylene with 2 to 18 carbon atoms, preferably ethylene and/or propylene, most preferably ethylene,
n is an integer from 5 to 500, preferably 10 to 200, most preferably 10 to 100,
R is H or a saturated or unsaturated hydrocarbon residue, preferably a C1 to C15 alkyl radical, more preferably a C1 to C3 alkyl radical, most preferably H,
M is H, an alkali metal, ½ earth alkali metal, an amine and/or organic amine residue.

The term organic amine residue comprises also organic amines like primary, secondary, tertiary and quarternary amines. It is to be understood that the respective (earth) alkali metals and amines will be mostly present in the form of the respective cations, respectively as alkali metal cations or ammonium ions and the phosphonate groups in the deprotonated form. The synthesis of dispersants according to the general formula (I) is described in detail in the patent application WO94/08913, which is hereby incorporated by reference. An example for this group of dispersants is the following chemical:

Dispersants based on phosphate, phosphinate and hypophosphinate, sulphates, sulphonates, sulphinates, borates and boronates radicals as anchor groups are described in WO 01/04185 A1.

Carboxylate radicals are especially suitable as anchor groups because of their high affinity to cement particles. Preferable is a plurality of carboxylate radicals as anchor group, more preferably at least three carboxylate radicals. Suitable dispersants are disclosed in WO 01/04185 A1 (synthesis example 1) as the reaction product (amide formation) of 1,2,3,4,5,6-cyclohexane hexacarboxylic acid with a molar excess of about 10% of methoxy polyoxyalkylene amine (Jeffamine M-2070 (XTJ-508)). The reaction product is supposed to have 5 carboxylic functionalities.

Preferably the subject dispersant is a reaction product of 1,2,3,4,5,6-cyclohexane hexacarboxylic acid and an alkoxy polyoxyalkylene amine with a number of alkylene oxide repeating units between 5 and 500, preferably the polyoxyalkylene is polyoxyethylene. Preferably the structure of the dispersant is according to the following general formula (II):

(II)

A is the same or different and independently from each other an alkylene with 2 to 18 carbon atoms, preferably ethylene and/or propylene, most preferably ethylene,
n is an integer from 5 to 500, preferably 10 to 200, most preferably 10 to 100,
R is H or a saturated or unsaturated hydrocarbon residue, preferably a C1 to C15 alkyl radical, more preferably a C1 to C3 alkyl radical,
$R^1$ is independently from each other a C1-C18 alkyl radical or a phenyl radical
M is H, an alkali metal, ½ earth alkali metal, an amine and/or organic amine residue.

The term organic amine residue comprises also organic amines like primary, secondary, tertiary and quarternary amines. It is to be understood that the respective (earth) alkali metals and amines will be mostly present in the form of the respective cations, respectively as alkali metal cations or ammonium ions and the carboxylic groups in the deprotonated form.

Water-soluble dispersants comprising one polyalkyleneglycol structural unit and three carboxylate radicals can be obtained from the following list of tetracarboxylic acids, 2,5-dihydroxy-tetrahydrofuran-2,3,4,5-tetracarboxylic acid, 5-hydroxy-cyclohexane-1,2,3,4-tetracarboxylic acid, 6-hydroxy-tetrahydropyran-2,3,4,5-tetracarboxylic acid, 1,4-dihydroxy-butane-1,1',4,4'-tetracarboxylic acid, 1,3-dihydroxy-propane-1,1',3,3'-tetracarboxylic acid and 2-(4-hydroxyphenyl)-propane-1,1',3,3'-tetracarboxylic acid by reaction of the respective tetracarboxylic acids with an alkoxy polyoxyalkylene amine with a number of alkylene oxide repeating units between 5 and 500, preferably the polyoxyalkylene is polyoxyethylene.

The synthesis can be done in analogy to the synthesis example 1 in WO 01/04185 A1, by replacement of the respective amount of 1,2,3,4,5,6-cyclohexane hexacarboxylic acid by the respective tetracarboxylic acids. The reaction is an amide formation, which leads mainly to a tricarboxylic end product.

An alternative product can be obtained by reacting one of the polycarboxylic acids mentioned in the before standing text, preferably hexacarboxylic or tetracarboxylic acids, with an amino-functional intermediate urethane product to a water-soluble water-dispersant having an amide and an urethane unit in its structure. Said reaction is an amide formation between the polycarboxylic acid and the amino-functional intermediate urethane product. Preferable are water-reducers having an amide and an urethane unit in its structure are according to the following general formula (II'):

R—O-(AO)$_n$—CO—NH—Y—NH—CO—X, (II')

wherein
A is the same or different and independently from each other an alkylene with 2 to 18 carbon atoms, preferably ethylene and/or propylene, most preferably ethylene,
n is an integer from 5 to 500, preferably 10 to 200, most preferably 10 to 100,
R is H or a saturated or unsaturated hydrocarbon residue, preferably a C1 to C15 alkyl radical, more preferably a C1 to C3 alkyl radical,
Y is the residue of a diisocyanate without the two diisocyanate groups and
X is the residue of a polycarboxylic acid or its salt without one carboxylic acid group.

Y can be for example a toluene radical if TDI was used as an unsymmetrical diisocyanate. X can be for example a phenyl residue substituted with 5 carboxylic acid groups if 1,2,3,4,5,6-cyclohexane hexacarboxylic was used as the polycarboxylic acid.

The intermediate urethane product mentioned in the before standing text can be obtained in a two step reaction. The first step is the reaction of about equal molar amounts of an alkylpolyalkyleneglycol with a diisocyanate, preferably a not symmetrical diisocyanate, most preferably toluene diisocyanate, to the respective urethane having one isocyanate group (R—O-(AO)$_n$—CO—NH—Y—NCO). In the second step the amino-functional intermediate urethane product (R—O-(AO)$_n$—CO—NH—Y—NH$_2$) is obtained by hydrolysis of said monoisocyanate (R—O-(AO)$_n$—CO—NH—Y—NCO).

Further preferable anionic groups are described in the dependent claims. It is believed that the anionic groups can substantially interact with the surface of the basically positively charged surface of the cement particles in aqueous systems. In a similar manner an interaction between calcium silicate hydrate (C—S—H) particles formed during the subject process and the subject dispersants is believed to take place.

Silane radicals are another type of anchor group, which can be used. Suitable silane radicals should be able to react with water under alkaline conditions (usual condition in aqueous cementitious systems) to a silanol intermediate comprising at least one Si—OH structural unit. The Si—OH unit is supposed to be able to react with Si—OH (as is present on the surface of cement particles or calcium silicate hydrate particles) in a condensation.

Preferably the silane radical is selected from the group of mono-, di- and trialkoxy silanes, preferably a C1 to C10 alkoxy silane. More preferable are in each case the trialkoxy silanes. Especially preferable are —Si(OMe)$_3$ and/or —Si(OCH$_2$CH$_3$)$_3$ radicals. Acyloxy silanes, preferably triacyloxy silanes, can also be used. It is preferable that at least 2 silane radicals, the silane radicals being able to react with water under alkaline conditions to a silanol intermediate are present in the dispersant. Examples for the respective dispersants with one or more silane groups can be found in the patent application WO 01/04185 A1. All dispersants based on a silane chemistry described in said patent application, are included by reference into the present patent application.

Preferable are dispersants with two trialkoxysilane radicals according to the following general structure (III). The synthesis of a representative of this class of compounds is described in detail in WO 01/04185 A1 (synthesis example 4).

R—O-(AO)$_n$—CH$_2$CH$_2$—O—CO—N—[CH$_2$CH$_2$—NH—CO—NH—(CH$_2$)$_3$—Si(OR$^1$)$_3$]$_2$ wherein
R is H, preferably a saturated or unsaturated hydrocarbon residue, more preferably a C1 to C15 alkyl radical, most preferably a C1 to C3 alkyl radical, A is an alkylene group, preferably comprising more than 90 mol-% ethylene groups
n is an integer from 5 to 500, preferably from 10 to 200,
$R^1$ is a C1 to C18 alkyl group, preferably a methyl group.

Dispersants with one trialkoxysilane radical can be obtained for example by the reaction of 3-(trialkoxysilyl) propyl isocyanates with polyalkylene glycol derivatives such as alkoxy polyoxyalkylene amines or alkoxy polyoxyalkylene alcohols. The reaction between the isocyanate group and the amine/hydroxy group will result in the formation of the respective urea and urethane derivatives.

Polyhydroxy radicals are a further possibility for anchor groups. Preferably the polyhydroxy radicals comprise at least three hydroxyl radicals, more preferably at least 5 hydroxy radicals, more preferably the polyhydroxy radicals are derived from a sugar compound, most preferably from a sugar lactone. For example glucoheptonic lactone or gluconic lactone can be reacted with polyalkyleneglycol amines under amide formation as described in WO 01/04185 A1 (synthesis examples 3 and 5). The dispersants basing on a chemistry of polyhdroxy radicals described in the patent application WO 01/04185 A1, are included by reference into the present patent application.

Preferable are dispersants according to the following general structure (IV):

R—O-(AO)$_n$—CH$_2$CH(R$^1$)—NH—CO—(CH(OH))$_m$—CH$_2$—OH  (IV)

A is the same or different and independently from each other an alkylene with 2 to 18 carbon atoms, preferably ethylene and/or propylene, most preferably ethylene,
n is an integer from 5 to 500, preferably 10 to 200, most preferably 10 to 100,
m is an integer from 4 to 6, preferably 4 or 5, most preferably 5,
R is H or a saturated or unsaturated hydrocarbon residue, preferably a C1 to C15 alkyl radical, more preferably a C1 to C3 alkyl radical, most preferably a C1 to C15 alkyl radical,
$R^1$ is a C1 to C18 alkyl group, preferably a methyl group.

Anionic derivatives of polyhydroxy compounds, more preferable anionic derivatives of sugar derivatives, like for example phosphate esters of sugars can also be used as the water-soluble dispersant. The compounds can be obtained by phosphation of respective dispersants comprising a residue originating from a sugar acid (for example the phosphation of products of synthesis examples 3 and 5 in WO 01/04185 A1).

A preferable process is characterized in that the functional group (in the water-soluble dispersant) being able to interact as an anchor group with the surface of cement particles, comprises carboxylate radicals, phosphate radicals, phosphonate radicals, silane radicals the silane radicals being able to react with water to a silanol compound under alkaline conditions and/or at least 3 hydroxy radicals, preferably derived from a sugar compound. The acid forms of the mentioned salts are included. Preferably the functional group being able to interact as an anchor group with the surface of cement particles comprises only one type of chemistry, for example only hydroxy radicals, carboxylate radicals, phosphate radicals, phosphonate radicals or silane radicals.

A preferable process is characterized in that the functional group being able to interact as an anchor group with the surface of cement particles comprises at least 5 hydroxy radicals, more preferably at least 6 hydroxy radicals, preferably the hydroxy radicals being derived from a sugar compound, most preferably a sugar lactone, at least 3 carboxylate radicals, at least 2 phosphate radicals, at least 2 phosphonate radicals or at least 2 silane radicals, the silane radicals being able to react with water to a silanol compound under alkaline conditions. Preferably the functional group being able to interact as an anchor group with the surface of cement particles comprises only one type of chemistry.

Preferably the process is characterized in that the polyalkyleneglycol comprises at least 5 alkylene oxide repeating units, preferably from 10 to 500 alkylene oxide repeating units, more preferably from 10 to 200 alkylene oxide repeating units, and contains more than 80 mol-% of ethyleneglycol units, preferably more than 90 mol-% of ethyleneglycol units. Preferably the polyalkyleneglycol is polyethyleneglycol.

Preferable is a process in which at the other end of the polyalkyleneglycol structural unit, no group is present, which would be substantially able to interact as an anchor group with the surface of cement particles. The groups substantially not able to interact as an anchor group with the surface of cement particles are preferably non-ionic, more preferably not anionic, are not a silane and/or are not a polyhydroxy compound with more than two hydroxy radicals. Groups substantially not able to interact as an anchor group with the surface of cement particles, preferably do not comprise hydroxy radicals, particularly not more than two hydroxy radicals, carboxylate radicals, phosphate radicals, phosphonate radicals or silane radicals. However it is possible that only one or two hydroxy radicals can be attached, because only one or two hydroxy radicals do not substantially interact with the surface of cement particles. Typical groups that would substantially not interact with the surface of cement particles are saturated or unsaturated hydrocarbons, like for example branched or straight chain aliphatic hydrocarbons (for example methyl radicals), olefins and/or alkynes. Also aromatic compounds would be expected to not substantially interact with the surface of cement particles or to show only a very low interaction.

In principle, the accelerator contains an inorganic and an organic component, the organic component being the water-soluble dispersant as described in the before standing text. The inorganic component may be regarded as modified, finely dispersed calcium silicate hydrate, which may contain foreign ions, such as magnesium and aluminium. The calcium silicate hydrate is prepared in the presence of the subject water-soluble dispersant, which is a water-soluble dispersant comprising at least one polyalkylenglycol structural unit with a functional group at one end of the polyalkyleneglycol, said functional group being able to interact as an anchor group with the surface of cement particles, said dispersant being preferably suitable as a plasticizer for hydraulic binders. Usually, a suspension containing the calcium silicate hydrate in finely dispersed form is obtained, which suspension effectively accelerates the hardening process of hydraulic binders.

The inorganic component can in most cases be described with regard to its composition by the following empirical formula:

$a$CaO,SiO$_2$,$b$Al$_2$O$_3$,$c$H$_2$O,$d$X,$e$W

X is an alkali metal
W is an alkaline earth metal

| $0.1 \leq a \leq 2$ | preferably | $0.66 \leq a \leq 1.8$ |
| $0 \leq b \leq 1$ | preferably | $0 \leq b \leq 0.1$ |

-continued

| | | |
|---|---|---|
| 1 ≤ c ≤ 6 | preferably | 1 ≤ c ≤ 6.0 |
| 0 ≤ d ≤ 1 | preferably | 0 ≤ d ≤ 0.4 |
| 0 ≤ e ≤ 2 | preferably | 0 ≤ e ≤ 0.1 |

In a preferred embodiment, the aqueous solution also contains, in addition to silicate and calcium ions, further dissolved ions which are preferably provided in the form of dissolved aluminium salts and/or dissolved magnesium salts. As aluminium salts preferably aluminium halogens, aluminium nitrate, aluminium hydroxide and/or aluminium sulphate can be used. More preferable within the group of aluminium halogens is aluminium chloride. Magnesium salts can be preferably magnesium nitrate, magnesium chloride and/or magnesium sulphate.

Advantage of the aluminium salts and magnesium salts is that defects in the calcium silicate hydrate can be created via the introduction of ions different to calcium and silicon. This leads to an improved hardening acceleration effect. Preferably the molar ratio of aluminium and/or magnesium to calcium and silicon is small. More preferably the molar ratios are selected in a way that in the previous empirical formula the preferable ranges for a, b and e are fulfilled (0.66≤a≤1.8; 0≤b≤0.1; 0≤e≤0.1).

Preferably, in a first step, the water-soluble calcium compound is mixed with the aqueous solution of the dispersant, so that a mixture preferably present as a solution is obtained, to which the water-soluble silicate compound is added in a subsequent second step. The water-soluble silicate compound of the second step can also contain the subject dispersant.

The aqueous solution may also contain one or more further solvents (for example alcohols like ethanol and/or isopropanol) in addition to water. Preferably the weight proportion of the solvent other than water to the sum of water and further solvent (e.g. alcohol) is up to 20 weight-%, more preferably less than 10 weight-% and the most preferably less than 5 weight-%. However most preferable are aqueous systems without any solvent.

The temperature range in which the process is carried out is not especially limited. Certain limits however are imposed by the physical state of the system. It is preferable to work in the range of 0 to 100° C., more preferable 5 to 80° C. and most preferable 15 to 35° C. High temperatures can be reached especially when a milling process is applied. It is preferable not to exceed 80° C.

Also the process can be carried out at different pressures, preferably in a range of 1 to 5 bars.

The pH-value depends on the quantity of reactants (water-soluble calcium compound and water-soluble silicate) and on the solubility of the precipitated calcium silicate hydrate. It is preferable that the pH value is higher than 8 at the end of the synthesis, preferably in a range between 8 and 13.5.

Preferably the aqueous solution containing the dispersant furthermore has the water-soluble calcium compound and the water-soluble silicate compound as components dissolved in it. This means that the reaction of the water-soluble calcium compound and the water-soluble silicate compound in order to precipitate calcium silicate hydrate occurs in the presence of an aqueous solution which contains the dispersant.

Preferably the process is characterized in that a solution of a water-soluble calcium compound and a solution of a water-soluble silicate compound are added preferably separately to the aqueous solution containing the dispersant. To illustrate how this aspect can be carried out, for example three solutions can be prepared separately (solution (I) of a water-soluble calcium compound, solution (II) of a water-soluble silicate compound and a solution (III) of the dispersant. Solutions (I) and (II) are preferably separately and simultaneously added to solution (III). Advantage of this preparation method is besides its good practicability that relatively small particle sizes can be obtained.

In a further preferred mode of implementation, the previous standing embodiment can be modified in that the solution of a water soluble calcium compound and/or the solution of a water-soluble silicate compound contain a subject dispersant. In this case the method is carried out in principle in the same way as described in the previous embodiment), but solution (I) and/or solution (II) preferably contain also the subject dispersant. In this case the person skilled in the art will understand that the dispersant is distributed to at least two or three solutions. It is advantageous that 1 to 50%, preferably 10 to 25% of the total of the dispersant are contained in the calcium compound solution (e.g. solution (I)) and/or silicate compound solution (e.g. solution (II)). This preparation method has the advantage that the dispersant is present also in the solution of the water-soluble calcium compound and/or the solution of the water-soluble silicate compound.

In a further preferred embodiment, the previous embodiment can be modified in that the aqueous solution containing a subject dispersant contains a water-soluble calcium compound or a water-soluble silicate compound.

In this case the method is carried out in principle in the same way as described in the previous embodiment, but solution (III) would contain a water-soluble calcium compound or a water-soluble silicate compound. In this case the person skilled in the art will understand that the water-soluble calcium compound or the water-soluble silicate compound is distributed to at least two solutions.

In general, the components are used in the following ratios:
 i) 0.01 to 75, preferably 0.01 to 51, most preferably 0.01 to 15% by weight of water-soluble calcium compound,
 ii) 0.01 to 75, preferably 0.01 to 55, most preferably 0.01 to 10% by weight of water-soluble silicate compound,
 iii) 0.001 to 60, preferably 0.1 to 30, most preferably 0.1 to 10% by weight of the dispersant,
 iv) 24 to 99, preferably 50 to 99, most preferably 70 to 99% by weight of water.

Preferably the hardening accelerator composition is dosed at 0.01 to 10 weight-%, most preferably at 0.1 to 2 weight-% of the solids content with respect to the hydraulic binder, preferably cement. The solids content is determined in an oven at 60° C. until a constant weight of the sample is reached.

Often, the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate calcium aluminate, tricalcium silicate and/or dicalcium silicate. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate).

The water-soluble calcium compound is preferably present as calcium citrate, calcium tartrate, calcium formate and/or calcium sulphate. Advantage of these calcium compounds is their non-corrosiveness. Calcium citrate and/or calcium tartrate are preferably used in combination with other calcium sources because of the possible retarding effect of these anions when used in high concentrations.

Preferably the calcium compound is present as calcium chloride and/or calcium nitrate.

Advantage of these calcium compounds is their good solubility in water, low price and good availability.

Often, the water-soluble silicate compound is present as sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass. Advantage of these silicate compounds is their extremely good solubility in water.

Preferably species of different types are used as the water-soluble silicate compound and as the water-soluble calcium compound.

In a preferable process water-soluble alkali metal ions (for example lithium, sodium, potassium . . . ) are removed from the hardening accelerator composition by cation exchangers and/or water-soluble nitrate and/or chloride ions are removed from the hardening accelerator composition by anion exchangers. Preferably the removal of said cations and/or anions is carried out in a second process step after the preparation of the hardening accelerator composition by the use of the ion exchangers. Acid ion exchangers suitable as cation exchanger are for example based on sodium polystyrene sulfonate or poly-2-acrylamido-2-methylpropane sulfonic acid (poly AMPS). Basic ion exchangers are for example based on amino groups, like for example poly (acrylamido-N-propyltrimethylammonium chloride) (poly APTAC).

Also provided is a process for the preparation of a hardening accelerator composition by reaction of a calcium compound, preferably a calcium salt, most preferably a water-soluble calcium salt with a silicon dioxide containing component under alkaline conditions characterized in that the reaction is carried out in the presence of an aqueous solution which contains a water-soluble dispersant comprising at least one polyalkyleneglycol structural unit with a functional group at one end of the polyalkyleneglycol, said functional group being able to interact as an anchor group with the surface of cement particles, said dispersant being preferably suitable as a plasticizer for hydraulic binders.

Typically the calcium compounds are calcium salts (e.g. calcium salts of carboxylic acids). The calcium salt can be for example calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochloride, calcium iodate, calcium iodide, calcium lactate, calcium nitrite, calcium oxalate, calcium phosphate, calcium propionate, calcium silicate, calcium stearate, calcium sulphate, calcium sulphate hemihydrate, calcium sulphate dihydrate, calcium sulphide, calcium tartrate, calcium aluminate, tricalcium silicate and/or dicalcium silicate. Preferable are calcium hydroxide and/or calcium oxide because of their strong alkaline properties. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate). Less preferable are also not so good soluble calcium salts like for example calcium carbonate and also calcium salts with retarding anions (e.g. citrate, gluconate, tartrate can retard the hardening of hydraulic binders). In the case of neutral or acid calcium salts (e.g. calcium chloride or calcium nitrate) it is preferable to use a suitable base to adjust the pH-value to alkaline conditions (e.g. lithium hydroxide, sodium hydroxide, potassium hydroxide, ammonia, magnesium hydroxide or any other earth alkali hydroxide). Preferable is a pH-value higher than 8, more preferable higher than 9 and most preferable higher than 11. The pH-value is measured preferably at 25° C. and with a solid content of the suspension of 1 weight-%.

It is possible to use any material which contains silicon dioxide, for example microsilica, pyrogenic silica, precipitated silica, blast furnace slag and/or quartz sand. Small particle sizes of the silicon dioxide containing material are preferable, especially particle sizes below 1 µm. Further it is possible to use compounds which are able to react in an aqueous alkaline environment to silicon dioxide like for example tetraalkoxy silicon compounds of the general formula $Si(OR)_4$. R can be the same or different and can be for example selected from a branched or non-branched C1 to C10 alkyl group. Preferably R is methyl, especially preferably ethyl.

In a preferred embodiment the silicon dioxide containing compound is selected from the group of microsilica, pyrogenic silica, precipitated silica, blast furnace slag and/or quartz sand. Preferable are microsilica, pyrogenic silica and/or precipitated silica, especially precipitated and/or pyrogenic silica. The types of silica, which are listed above are defined in Ullmann's Encyclopedia of Industrial Chemistry, Wiley-VCH, Release 2009, $7^{th}$ Edition, DOI 10.1002/14356007.a23_583.pub3.

It is preferable to apply mechanical energy, preferably by milling, to the reaction mixture in order to activate and/or accelerate the reaction of the calcium salt with the usually low water-soluble silicon dioxide containing component. The mechanical energy is also advantageous in order to reach the desired small particle sizes of the calcium silicate hydrates. The wording "milling" means in this patent application any process in which high shear forces are exerted on the reaction mixture in order to accelerate the reaction and to obtain a suitable particle size. For example milling can be carried out in a planet ball mill in a continuous or batch operation mode. Alternatively an ultradisperser, preferably with a number of revolutions higher than 5.000 r.p.m. can be used. Also it is possible to apply a so-called shaker equipment in which small grinding bodies, preferably smaller than 1 mm in diameter are put together with the reaction mixture into a receptacle and are shaken. The respective shaker equipment is for example available from the company Skandex.

Typically the pH-value of the process for the preparation of a hardening accelerator is higher than 9.

Preferably the molar ratio of calcium from the calcium compound to silicon from the silicon dioxide containing component is from 0.6 to 2, preferably 1.1 to 1.8.

Typically the weight ratio of water to the sum of calcium compound and silicon dioxide containing component is from 0.2 to 50, preferably 2 to 10, most preferably 4 to 6.

In this context water means the water in the reaction mixture, in which the process is carried out. It is preferable to carry out the process at relatively low water contents in order to increase the output of the process. Also it is possible to obtain relatively conveniently dry products from the wet products because not so much water has to be removed. A ratio of 2 to 10, respectively 4 to 6 is especially preferred because a paste like consistency of the products can be obtained, which is preferable for the milling process.

It is preferred that the process is carried out at a site of concrete production (for example a ready-mix concrete, precast concrete plant or any other plant where mortar, concrete or any other cementitious products are produced), characterized in that the obtained hardening accelerator composition is used as the batching water. The obtained hardening accelerator composition is an aqueous system and can be used directly as the batching water, especially when designing the hardening accelerators according to the specific needs of a job-site.

Batching water in this context is the water, which is used in concrete production or production of similar cementitious materials. Typically the batching water is mixed with cement and for examples aggregates at a ready mix concrete plant or precast concrete plant, at a construction site or any other place where concrete or other cementitious materials are produced. Usually the batching water can contain a wide range of additives like for example plasticizers, hardening accelerators, retarders, shrinkage reducing additives, air entrainers and/or defoamers. It is advantageous to produce the hardening accelerators in the batching water intended for production of concrete or similar materials, because there is no need to transport the respective admixtures.

A further preferred embodiment, preferably carried out at a site of concrete production (for example a ready mix concrete or precast concrete plant) is characterized in that the weight ratio of the sum of water-soluble calcium compound, water-soluble silicate compound and subject dispersant to water, preferably batching water, is between 1/1000 and 1/10, more preferably between 1/500 and 1/100. A high dilution of the suspensions is advantageous for the efficiency of the hardening accelerators.

In a further embodiment, the reaction is carried out completely or partially in the presence of an aqueous solution containing a viscosity enhancer polymer, selected from the group of polysaccharide derivatives and/or (co)polymers with an average molecular weight $M_w$ higher than 500,000 g/mol, more preferably higher than 1,000,000 g/mol, the (co)polymers containing structural units derived (preferably by free radical polymerization) from non-ionic (meth)acrylamide monomer derivatives and/or sulphonic acid monomer derivatives. It is possible that the viscosity enhancer polymer is added at the beginning, during the process or at the end of the process. For example it can be added to the aqueous solution of the comb polymer, to the calcium compound and/or the silicate compound. The viscosity enhancer polymer can also be used during the process of preparing a hardening accelerator composition by reaction of a calcium compound, preferably a calcium salt, most preferably a water-soluble calcium salt with a silicon dioxide containing component. Preferably the viscosity enhancer polymer is added at the end of the reaction (at the end of the reactants addition) in order to prevent any particles to be destabilized and to keep the best stability. The viscosity enhancer has a stabilizing function in that segregation (aggregation and sedimentation) of for example calcium silicate hydrate) can be prevented. Preferably the viscosity enhancers are used at a dosage from 0.001 to 10 weight-%, more preferably 0.001 to 1 weight-% with respect to the weight of the hardening accelerator suspension. The viscosity enhancer polymer preferably should be dosed in a way that a plastic viscosity of the hardening accelerator suspensions higher than 80 mPa·s is obtained.

As polysaccharide derivative preference is given to cellulose ethers, for example alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference is given to methylhydroxyethylcelluose (MHEC) and methylhydroxypropylcelluose (MHPC). The abovementioned cellulose ether derivatives, which can in each case be obtained by appropriate alkylation or alkoxylation of cellulose, are preferably present as non ionic structures, however it would be possible to use for example also carboxymethylcellulose (CMC). In addition, preference is also given to using non ionic starch ether derivatives such as hydroxypropylstarch, hydroxyethylstarch and methyl-hydroxypropylstarch. Preference is given to hydroxypropylstarch. Preferable are also microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae, in the case of galactomannans from carob seeds.

The viscosity enhancer (co)polymers with a weight average molecular weight $M_w$ higher than 500,000 g/mol, more preferably higher than 1,000,000 g/mol can be produced (preferably by free radical polymerization) from non-ionic (meth)acrylamide monomer derivatives and/or sulphonic acid monomer derivatives. The respective monomers can be selected for example from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of styrene sulphonic acid, 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentanesulphonic acid or the salts of the acids mentioned. It is preferable that the viscosity enhancer contains more than 50 mol-%, more preferably more than 70 mol-% of structural units derived from non-ionic (meth)acrylamide monomer derivatives and/or sulphonic acid monomer derivatives. Other structural units preferably being contained in the copolymers can be derived from for example the monomers (meth)acrylic acid, esters of (meth)acrylic acid with branched or non-branched C1 to C10 alcohols, vinyl acetate, vinyl proprionate and/or styrene.

Preferably the viscosity enhancer polymer is a polysaccharide derivative selected from the group of methylcellulose, hydroxyethylcellulose (HEC), hydroxypropylcellulose (HPC), methylhydroxyethylcellulose (MHEC), methylhydroxypropylcellulose (MHPC) and/or (co)polymers with an average molecular weight $M_w$ higher than 500,000 g/mol, more preferably higher than 1,000,000 g/mol, the (co) polymers containing structural units derived (preferably by free radical polymerization) from non-ionic (meth)acrylamide monomer derivatives selected from the group of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulphonic acid monomer derivatives selected from the group of 2-acrylamido-2-methylpropanesulphonic acid, 2-methacrylamido-2-methylpropanesulphonic acid, 2-acrylamidobutanesulphonic acid, and/or 2-acrylamido-2,4,4-trimethylpentanesulphonic acid or the salts of the acids mentioned.

Within the group of non-ionic (meth)acrylamide monomer derivatives preference is given to methylacrylamide, N,N-dimethylacrylamide and/or methacrylamide, and particular preference is given to acrylamide. Within the group of sulphonic acid monomers 2-acrylamido-2-methylpropanesulphonic acid (AMPS) and its salts are preferable. The amines can be added at the beginning of the process or at any other time.

In a further embodiment, the reaction is carried out completely or partially in the presence of an aqueous solution containing hardening accelerators selected from the group of alkanolamines, preferably triisopropanolamine and/or tetrahydroxyethyl ethylene diamine (THEED). Preferably the alkanolamines are used at a dosage from 0.01 to 2.5 weight-% with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems. Preferably the amine is added at the end of the reaction.

In another embodiment the reaction is carried out completely or partially in the presence of an aqueous solution containing setting retarders selected from the group of citric acid, tartaric acid, gluconic acid, phosphonic acid, aminotrimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars (e.g. glucose, molasses). The advantage of the addition of setting retarders is that the open time can be controlled and in particular if necessary can be prolonged. The term "open-time" is understood by the person skilled in the art as the time interval after preparing the hydraulic binder mixture until the point of time at which the fluidity is considered as not sufficient anymore to allow a proper workability and the placement of the hydraulic binder mixture. The open-time depends on the specific requirements at the job site and on the type of application. As a rule the precast industry requires between 30 and 45 minutes and the ready-mix concrete industry requires about 90 minutes of open-time. Preferably the setting retarders are used at a dosage from 0.01 to 0.5 weight-% with respect to the weight of hydraulic binder, preferably cement. The retarders can be added at the beginning of the process or at any other time.

In a preferred embodiment the hardening accelerator composition obtained according to any of the above mentioned embodiments is dried, preferably by a spray drying process. The drying method is not especially limited, another possible drying method is for example the use of a fluid bed dryer. It is generally known that water, also if only in low quantities, is detrimental to many binders, especially cement, because of undesired premature hydration processes. Powder products with their typically very low content of water are advantageous compared to aqueous systems because it is possible to mix them into cement and/or other binders like gypsum, calcium sulphate hemihydrate (bassanite), anhydrous calcium sulphate, slags, preferably ground granulated blast furnace slag, fly ash, silica dust, metakaolin, natural pozzolan, calcined oil shale, calcium sulphoaluminate cement and/or calcium aluminate cement.

Further provided is a hardening accelerator composition which is obtainable by the process described above.

According to another aspect, a composition, preferably aqueous hardening accelerator suspension, containing calcium silicate hydrate and a water-soluble dispersant comprising at least one polyalkyleneglycol structural unit with a functional group at one end of the polyalkyleneglycol, said functional group being able to interact as an anchor group with the surface of cement particles, said dispersant being preferably suitable as a plasticizer for hydraulic binders, is concerned.

In a further embodiment, the composition is characterized in that the particle diameter of the calcium silicate hydrate is smaller than 1,000 nm, more preferably smaller than 500 nm, the particle size of the calcium silicate hydrate being measured by analytical ultracentrifugation.

Preferably the composition is free of hydraulic binders, especially free of cement. Preferably no cement is used during the production process of the hardening accelerators.

Preferably the particle diameter of the calcium silicate hydrate is smaller than 1,000 nm, preferably smaller than 300 nm, the particle size of the calcium silicate hydrate being measured by light scattering with a MasterSizer® 2000 laser diffraction particle size analyzer from the company Malvern.

In the composition containing calcium silicate hydrate and a water-soluble dispersant, the functional group in the dispersant being able to interact as an anchor group with the surface of cement particles comprises preferably carboxylate radicals, phosphate radicals, phosphonate radicals, silane radicals, the silane radicals being able to react with water to a silanol compound under alkaline conditions and/or at least 3 hydroxy radicals, preferably derived from a sugar compound. The acid forms of the before standing salts are included. Preferably the functional group being able to interact as an anchor group with the surface of cement particles comprises only one type of chemistry, for example only hydroxy radicals, carboxylate radicals, phosphate radicals, phosphonate radicals or silane radicals. Examples for each type of dispersant were given in the before standing text.

Preferable is furthermore that the functional group being able to interact as an anchor group with the surface of cement particles comprises at least 5 hydroxy radicals, more preferably at least 6 hydroxy radicals, preferably the hydroxy radicals being derived from a sugar compound, most preferably a sugar lactone, at least 3 carboxylate radicals, at least 2 phosphate radicals, at least 2 phosphonate radicals or at least 2 silane radicals. Preferably the functional group being able to interact as an anchor group with the surface of cement particles comprises only one type of chemistry, for example only hydroxy radicals, carboxylate radicals, phosphate radicals, phosphonate radicals or silane radicals. Examples for each type of dispersant were given in the before standing text.

Preferable is that the functional group being able to interact as an anchor group with the surface of cement particles contains at least 2 phosphonate radicals and is characterized by the following general structure (I), R—O-(AO)$_n$—CH$_2$CH$_2$—N—[CH$_2$—PO(OM)$_2$]$_2$ (I)

wherein
R, A, n and M have the same meaning as described in detail in the before standing text for the general structure (I).

Preferable is that the polyalkyleneglycol comprises at least 5 repeating units, preferably from 10 repeating units to 500 repeating units, more preferably from 10 to 200 repeating units, and contains more than 80 mol-% of ethyleneglycol units, preferably more than 90 mol-% of ethyleneglycol units. More preferably the polyalkyleneglycol is polyethyleneglycol.

Preferable is that at the other end of the polyalkyleneglycol structural unit, no group is present, which would be substantially able to interact as an anchor group with the surface of cement particles. The groups substantially not able to interact as an anchor group with the surface of cement particles were mentioned in the before standing text.

Preferably the aqueous hardening accelerator composition contains
i) 0.1 to 75, preferably 0.1 to 50, the most preferably 0.1 to 10% by weight of calcium silicate hydrate,
ii) 0.001 to 60, preferably 0.1 to 30, most preferably 0.1 to 10% by weight of dispersant,
iii) 24 to 99, more preferably 50 to 99, most preferably 70 to 99% by weight of water.

Typically the calcium silicate hydrate in the composition, preferably aqueous hardening accelerator suspension, is foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-C$_2$SH, dellaite, jaffeite, rosenhahnite, killalaite and/or suolunite.

More preferably the calcium silicate hydrate in the composition, preferably aqueous hardening accelerator suspension, is xonotlite, 9 Å-tobermorite (riversiderite), 11 Å-tobermorite, 14 Å-tobermorite (plombierite), jennite, metajennite, afwillite and/or jaffeite.

In a preferred embodiment, the molar ratio of calcium to silicon in the calcium silicate hydrate in the composition, preferably aqueous hardening accelerator suspension, is from 0.6 to 2, preferably from 1.1 to 1.8.

Preferably the molar ratio of calcium to water in the calcium silicate hydrate is from 0.6 to 6, preferably 0.6 to 2, more preferably 0.8 to 2. Said ranges are similar to those found for example in calcium silicate hydrate phases, which are formed during the hydration of cement. Advantage is a good acceleration effect for hydraulic binders.

Preferably the hardening accelerator suspension contains a viscosity enhancer polymer, selected from the group of polysaccharide derivatives and/or (co)polymers with an average molecular weight M$_w$ higher than 500,000 g/mol, more preferably higher than 1,000,000 g/mol the (co)polymers containing structural units derived (preferably by free radical polymerization) from non-ionic (meth)acrylamide monomer derivatives and/or sulphonic acid monomer derivatives. Preferably the viscosity enhancers are used at a dosage from 0.001 to 10 weight-%, more preferably 0.001 to 1 weight-% with respect to the weight of the hardening accelerator suspension. The viscosity enhancer polymer preferably should be dosed in a way that a plastic viscosity of the hardening accelerator suspensions higher than 80 mPa·s is obtained. Details of the viscosity enhancer polymers are given in the previous text (in the description of the process), which is incorporated here.

It is particularly advantageous to use the hardening accelerators in combination with cements containing a relatively high content of soluble sulphates (from 0.1 to 5 weight-% with respect to the cement). Such cements are commercially available or the water-soluble sulphate salt can be added to the cement. Said cement is preferably rich in anhydrous aluminate phases. Preferably the water-soluble sulphate is selected from sodium and/or potassium sulphate. Combining the soluble sulphates and hardening accelerators results into a synergetic hardening acceleration effect of cement.

The composition, preferably hardening accelerator suspension, contains preferably hardening accelerators selected from the group of alkanolamines, preferably triisopropanolamine and/or tetrahydroxyethyl ethylene diamine (TREED). Preferably the alkanolamines are used at a dosage from 0.01 to 2.5 weight-% with respect to the weight of hydraulic binder, preferably cement. Synergistic effects could be found when using amines, especially triisopropanolamine and tetrahydroxyethyl ethylene diamine, with respect to the early strength development of hydraulic binder systems, especially cementitious systems.

The composition, preferably aqueous hardening accelerator suspension, contains preferably setting retarders selected from the group of citric acid, tartaric acid, gluconic acid, phosphonic acid, amino-trimethylenphosphonic acid, ethylendiaminotetra(methylenphosphonic) acid, diethylentriaminopenta(methylenphosphonic) acid, in each case including the respective salts of the acids, pyrophosphates, pentaborates, metaborates and/or sugars (e.g. glucose, molasses). The advantage of the addition of setting retarders is that the open-time can be controlled and in particular if necessary can be prolonged. Preferably the setting retarders are used at a dosage from 0.01 to 0.5 weight-% with respect to the weight of hydraulic binder, preferably cement.

The compositions, preferably aqueous hardening accelerator suspensions can also contain any formulation component typically used in the field of construction chemicals, preferably defoamers, air entrainers, retarders, shrinkage reducers, redispersible powders, other hardening accelerators, anti-freezing agents and/or anti-efflorescence agents.

It is possible to partially replace the subject dispersants by other dispersants, which are well known as water-reducers for hydraulic binders, particularly cement. Those dispersants can be selected from the group of polycarboxylate ethers (PCEs), lignosulphonates, naphthalene sulphonates, phosphated polycondensation products as described in the unpublished patent application according to the PCT (PCT/EP2009/061545) and/or melamine formaldehyde sulphonates.

In a preferred embodiment, the composition is in powder form. The powder product can be obtained from the aqueous product by for example spray drying or drying in a fluid bed dryer.

Also provided is a method of using a hardening accelerator composition obtainable according to any of the subject processes, or of a subject composition, preferably an aqueous hardening accelerator suspension, in building material mixtures containing cement, gypsum, anhydrite, slag, preferably ground granulated blast furnace slag, fly ash, silica dust, metakaolin, natural pozzolans, calcined oil shale, calcium sulphoaluminate cement and/or calcium aluminate cement, preferably in building material mixtures which contain substantially cement as a hydraulic binder. Gypsum comprises in this context all possible calcium sulphate carriers with different amounts of crystal water molecules, like for example also calcium sulphate hemihydrate.

In an embodiment, building material mixtures are concerned, which contain a subject composition, preferably an aqueous hardening accelerator suspension, and cement, gypsum, anhydrite, slag, preferably ground granulated blast furnace slag, fly ash, silica dust, metakaolin, natural pozzolans, calcined oil shale, calcium sulpho aluminate cement and/or calcium aluminate cement. Preferably the building material mixtures contain substantially cement as a hydraulic binder. The hardening accelerator composition is contained in the building material mixture preferably at a dosage of 0.05 weight-% to 5 weight-% with respect to the clinker weight.

For illustration the term building material mixtures can mean mixtures in dry or aqueous form and in the hardened or plastic state. Dry building material mixtures could be for example mixtures of said binders, preferably cement and the hardening accelerator compositions (preferably in powder form). Mixtures in aqueous form, usually in the form of slurries, pastes, fresh mortar or fresh concrete are produced by the addition of water to the binder component(s) and the hardening accelerator composition, they transform then from the plastic to the hardened state.

EXAMPLES

Preparation of the Hardening Accelerator Compositions

It is possible to prepare the hardening accelerator compositions according to the processes described in WO2010/026155, replacing the polycarboxylate ethers by the subject dispersants. Here Optima®100, which is a commercial dispersant for cementitious compositions obtainable from the company Chryso, was used. Optima®100 is a 29.9 weight % solution of a polyethylene glycol structure with a diphosphonate anchor group.

Solutions 1, 2 and 3 were prepared according to the weight percentages given in Table 1.

mechanical stirring. The stirring rate(s) and the temperature are controlled during the whole synthesis. After the addition of the reactants, the suspension is further mixed for 30 minutes and afterwards collected and stored. The solid content of the suspension is measured by drying 3 g+/−0.1 g of the suspension in a crucible in porcelain 24 hours in an oven at 60° C. The solid content is given in the table 1.

Calorimetric Measurements

The influence of the hardening accelerators was tested on the cement Bernburg 42.5 R by the measurement of the heat released in heat flow calorimetrical measurements. The accelerator suspension was mixed with the batching water and the resulting suspension mixed with 25 g of the cement. The water to cement (w/c) ratio was set to 0.5.

The dosage of the accelerators to be tested is expressed as weight percentage of solid content with respect to the cement weight. The dosage in weight % of solid content was 1.0 weight % for Acc1, 1.10 weight % for Acc 2 and 1.14 weight % for Acc 3. For each trial, the dosage in "actives" is about 0.35 weight % with respect to the cement. "Actives" means here the solid content of the samples minus the portion of the dispersant Optima®100, in other words the inorganic part of the solids content.

Figure 1:
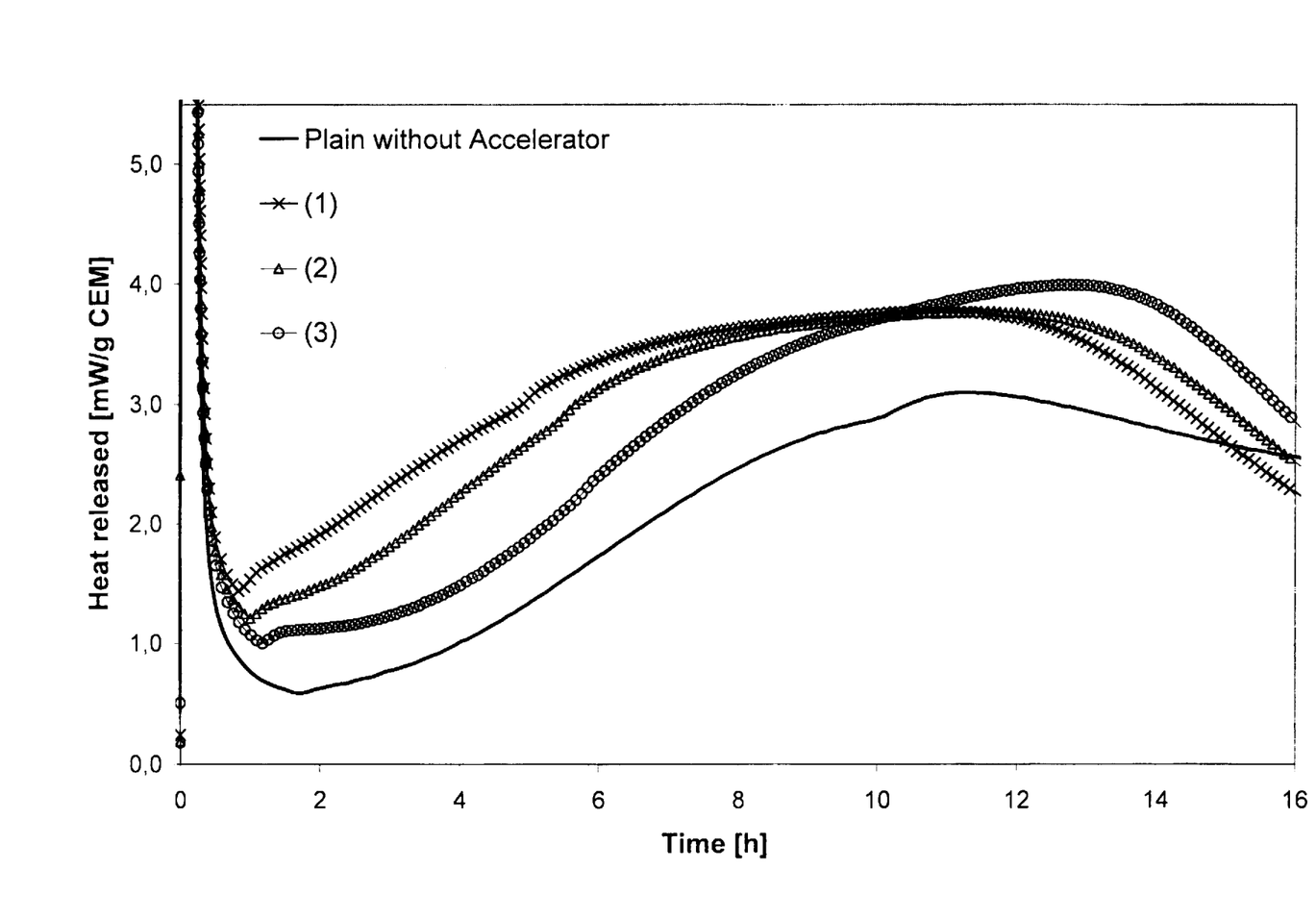
FIG. 1: Calorimetric Measurements

FIG. 1: Calorimetric Measurements

The addition of the subject hardening accelerator as described herein accelerates the acceleration period, which is defined in H. F. W. Taylor (1997): Cement Chemistry, $2^{nd}$ edition, p. 212ff. The comparison example without accelerator shows the lower heat development of samples without accelerator. The subject accelerators Acc1, Acc2 and Acc 3 are superior to the comparison example. Samples of hardening accelerators prepared in the absence of the dispersant Optima®100 resulted in basically no accelerating effect in calorimetric measurements and also in measurements of early strength as respective comparative results in WO2010/026155 show.

It will be understood that the embodiments described herein are merely exemplary, and that one skilled in the art

TABLE 1 preparation of hardening accelerators 1, 2 and 3

| ID | Solution 1 | Solution 2 | Solution 3 | Mixing Procedure with feeding rates | | Temp. | Stirring rate (rpm) | Total solid content (weight %) |
|---|---|---|---|---|---|---|---|---|
| Acc1 | 51.95 g of CN51 | 20.83 g of Metso + 21.74 g water | 25.5 g of Optima® 100 + 880 g water | 1 in 3 at 41.56 ml/h | 2 in 3 at 38.12 ml/h | 20° C. | 400 | 4.88% |
| Acc2 | 51.74 g of CN51 | 20.75 g of Metso + 21.66 g water | 38.11 g of Optima® 100 + 867.7 g water | 1 in 3 at 41.40 ml/h | 2 in 3 at 38 ml/h | 20° C. | 400 | 5.25% |
| Acc3 | 51.46 g of CN51 | 20.67 g of Metso + 21.58 g water | 50.6 g of Optima® 100 + 856 g water | 1 in 3 at 41.25 ml/h | 2 in 3 at 37.8 ml/h | 20° C. | 400 | 5.63% |

CN 51 is a 51 weight % calcium nitrate solution, Metso is sodium metasilicate pentahydrate powder from PQ corporation. Optima®100 was used as a 29.9 weight solution of the dispersant.

Solutions 1, 2 and 3 are prepared before starting the reaction by dissolving the water-soluble salts and mixing Optima®100 in water at room temperature until the complete dissolution. The reaction is started by feeding the respective solutions according to the mixing procedure indications in table 1 at the given addition rates under may make variations and modifications without departing from the spirit and scope of the claims. Further, all embodiments disclosed are not necessarily in the alternative, as various embodiments may be combined to provide the desired result.

The invention claimed is:

1. Process for the preparation of a hardening accelerator composition comprising an aqueous hardening accelerator suspension, in the absence of cement, by reacting a water-soluble calcium compound with a water-soluble silicate compound, wherein the water-soluble calcium compound is not a calcium silicate, the reaction of the water-soluble calcium compound with the water-soluble silicate compound occurring in the presence of an aqueous solution which contains a water-soluble dispersant comprising at least one polyalkyleneglycol structural unit with a functional group at one end of the polyalkyleneglycol, said functional group capable of interacting as an anchor group with the surface of cement particles, wherein the functional group comprises anionic radicals, silane radicals and/or polyhydroxy radicals, and the water-soluble dispersant does not contain polymeric structures other than the polyalkyleneglycol structural unit, wherein the aqueous hardening accelerator suspension is a hardening accelerator in building material mixtures containing cement, gypsum, anhydrite, slag, optionally ground granulated blast furnace slag, fly ash, silica dust, metakaolin, natural pozzolans, calcined oil shale, calcium sulpho aluminate cement and/or calcium aluminate cement;

wherein the functional group capable of interacting as an anchor group with the surface of cement particles, contains two phosphonate radicals, and is represented by the following general structure (I), (I)

wherein

A is the same or different and independently from each other an alkylene with two to 18 carbon atoms, optionally ethylene and/or propylene, further optionally ethylene, n is an integer from 10 to less than 100 and M is H, an alkali metal, ½ earth alkali metal and/or an amine, and R is H or a saturated or unsaturated hydrocarbon residue, optionally a C1 to C15 alkyl radical.

2. The process according to claim 1, wherein the components are used in the following ratios:
i) 0.01 to 75, optionally 0.01 to 51, further optionally 0.01 to 15% by weight of water-soluble calcium compound,
ii) 0.01 to 75, optionally 0.01 to 55, further optionally 0.01 to 10% by weight of water-soluble silicate compound,
iii) 0.001 to 60, optionally 0.1 to 30, further optionally 0.1 to 10% by weight of water-soluble dispersant,
iv) 24 to 99, optionally 50 to 99, further optionally 70 to 99% by weight of water.

3. The process according to claim 1, wherein the water-soluble calcium compound is present as calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochloride, calcium iodate, calcium iodide, calcium lactate, calcium nitrite, calcium oxalate, calcium phosphate, calcium propionate, calcium stearate, calcium sulphate, calcium sulphate hemihydrate, calcium sulphate dihydrate, calcium sulphide, calcium tartrate and/or calcium aluminate.

4. The Process according to claim 1, wherein the water-soluble silicate compound is present as potassium silicate, waterglass, aluminium silicate, silicic acid, sodium metasilicate and/or potassium metasilicate.

5. The process according to claim 1, wherein the functional group capable of interacting as an anchor group with the surface of cement particles comprises carboxylate radicals, phosphate radicals, phosphonate radicals, silane radicals, the silane radicals capable of reacting with water to form a silanol compound under alkaline conditions, and/or at least 3 hydroxy radicals, optionally derived from a sugar compound.

6. The process according to claim 1, wherein the functional group capable of interacting as an anchor group with the surface of cement particles comprises at least 5 hydroxy radicals, at least 3 carboxylate radicals, at least 2 phosphonate radicals or at least 2 silane radicals, the silane radicals capable of reacting with water to form a silanol compound under alkaline conditions.

7. The process according to claim 1, wherein the polyalkyleneglycol comprises at least 5 repeating units, optionally from 10 repeating units to 500 repeating units, further optionally from 10 to 200 repeating units, and contains more than 80 mol-% of ethyleneglycol units, optionally more than 90 mol-% of ethyleneglycol units.

8. The process according to claim 1, wherein at the other end of the polyalkyleneglycol structural unit, no group is present, capable of substantially interacting as an anchor group with the surface of cement particles.

9. The process according to claim 1, wherein the reaction occurs completely or partially in the presence of an aqueous solution containing a viscosity enhancer polymer, comprising at least one of polysaccharide derivatives or (co)polymers; wherein the polysaccharide derivatives' or (co)polymers' average molecular weight $M_w$ is higher than 500,000 g/mol, optionally higher than 1,000,000 g/mol, the (co) polymers containing structural units derived (optionally by free radical polymerization) from non-ionic (meth)acrylamide monomer derivatives and/or sulphonic acid monomer derivatives.

* * * * *